United States Patent Office 3,395,103
Patented July 30, 1968

3,395,103
PROCESS FOR MAKING SILICA-MAGNE-
SIA - MAGNESIUM FLUORIDE CRACK-
ING CATALYSTS
Charles P. Wilson, Jr., and Brownell Carr, Cincinnati,
Ohio, and Frank G. Ciapetta, Silver Spring, Md., assign-
ors to W. R. Grace & Co., New York, N.Y., a corpora-
tion of Connecticut
No Drawing. Filed Oct. 20, 1965, Ser. No. 499,046
12 Claims. (Cl. 252—441)

ABSTRACT OF THE DISCLOSURE

A process for preparing silica-magnesia-magnesium fluoride cracking catalysts comprising the steps of acidifying a sodium silicate solution and adjusting to pH 2.5 to 8.0, aging the silica gel, mixing said gel with magnesia, aging said mixture, mixing the silica-magnesia with an aqueous solution containing fluoride ions, separating the resultant product, drying, reslurrying, aging the product a final time, then washing and redrying the final product.

---

This invention relates to hydrocarbon cracking catalysts and, in particular, to the preparation of silica-magnesia-magnesium fluoride composites suitable for use as hydrocarbon cracking catalysts.

The structure of silica-magnesia cracking catalysts collapses when heated to temperatures above 1350° F. This collapse is accompanied by an almost complete loss in pore volume, surface area, and cracking activity. In U.S. Patents 2,901,440, 3,124,540 and 3,129,189 it was shown that the structural collapse at these elevated temperatures could be largely overcome by the incorporation of fluorine into the silica-magnesia catalysts. In general, one of the previously disclosed processes for preparing silica-magnesia-magnesium fluorine catalysts comprised reacting magnesia with silica hydrogel, aging the silica-magnesia slurry, recovering the silica-magnesia complex therefrom, reslurrying the complex with a solution containing dissolved fluorine, and washing and drying the silica-magnesia-magnesium fluoride composite products. In these previously disclosed processes, hot aging of the initial silica-magnesia slurry was relied upon to control the pore volume and surface area of the final product.

In commercial practice, the previously disclosed processes have been found to be subject to certain difficulties. In order to meet industrial requirements, it was found necessary to develop methods for improving the cracking activity as well as the thermal stability of the silica-magnesia-magnesium fluoride cracking catalysts. Although the thermal stability of the catalysts is determined largely by the fluorine content thereof, the effectiveness of the fluorine to provide stability was found to be increased by increasing the pore volume of the fresh catalysts. However, in the previously disclosed processes, steps taken to increase the pore volume of the catalyst effected a decrease in surface area and activity to levels which failed to meet industrial requirements. Furthermore, modifications of the previously disclosed processes to effect an increase in surface area and activity were found to decrease the pore volume, and hence, the thermal stability of the catalyst.

Another difficulty encountered with the previously disclosed processes arose from the method by which the silica-magnesia materials were contacted with the aqueous solution containing dissolved fluorine. In the previous processes, the fluorine was incorporated into the silica-magnesia composite by addition of the fluorine containing solution to the filter cake. This was done to eliminate from the silica-magnesia as much of the sodium salts as possible prior to the addition of fluorine. This was thought to be necessary to prevent the formation of insoluble fluorides containing sodium which could not be readily removed from the composite by washing with magnesium or ammonium salts. However, because of difficulties encountered in obtaining a reslurry of the filter cake, the fluorine was not dispersed throughout the silica-magnesia component as effectively as desired.

It is one object of this invention to provide a process for forming silica-magnesia-magnesium fluoride cracking catalysts having increased pore volumes and thermal stabilities and with surface areas and catalytic activities which meet industrial requirements.

It is another object of this invention to provide a process for forming silica-magnesia-magnesium fluoride cracking catalysts by a method which provides increased surface area and catalytic activity and avoids pore volume loss.

It is still another object of this invention to provide an improved process for forming silica-magnesia-magnesium fluoride cracking catalysts wherein the fluorine containing solution is uniformly dispersed throughout the silica-magnesia components.

In summary, the process of this invention is a method for preparing a silica-magnesia-magnesium fluoride hydrocarbon cracking catalyst containing from 0.5 to 5 percent fluorine. A silica hydrogel is initially formed by acidifying a dilute sodium silicate solution with a mineral acid such as sulfuric acid in an amount sufficient to effect gelation of the silica. Then the silica hydrogel is mixed with an additional quantity of a mineral acid sufficient to adjust the slurry pH to within the range of from 2.5 to 8.0, and aged at a temperature of from 70 to 150° F. for from 0.5 to 3 hours. The aged silica gel slurry is then mixed with a suspension of hydrated calcined magnesia and preferably with a quantity of a strong mineral acid sufficient to provide from 4 to 25 moles of magnesium hydroxide per mole of acid in the slurry. The silica-magnesia slurry is then aged at a temperature of from 120 to 190° F. for from 2 to 8 hours. Treatment of the silica-magnesia slurry with an aqueous solution containing dissolved fluorine can be improved by mixing the aged silica-magnesia slurry with the aqueous fluorine solution in quantities sufficient to provide from 0.5 to 5 percent fluorine in the final product at this stage. However, the silica-magnesia can be contacted with the aqueous solution containing fluorine at later stages in the process. The silica-magnesia-magnesium fluoride solids are then separated from the reaction mixture, reslurried with water, and dried. The reslurried solids are then aged at a temperature within the range of from 160 to 180° F. for from 1 to 4 hours, and the silica-magnesia-magnesium fluoride solids are then washed and redried to form the final composite product.

It has been found that the desired pore volume of silica-magnesia-magnesium fluoride product can be obtained by control of the aging temperatures and times of the aging of the silica-magnesia slurry prior to spray-drying. It has furthermore been found that increased surface area and activity of the composite product can be obtained by control of the final aging after spray-drying of the silica-magnesia-magnesium fluoride slurry, and that the surface area and activity can be increased thereby without effecting a serious decrease in pore volume of the final product. It has furthermore been found that more effective fluorine treatment of the silica-magnesia can be obtained if the aqueous fluorine containing solution is contacted with the aged silica-magnesia slurry prior to filtration, and that insoluble fluorides containing sodium which could not be readily removed by exchange or washing with magnesium or ammonium solutions did not occur.

In preparing the silica-magnesia-magnesium fluoride catalysts of this invention, silica gel is prepared from a dilute sodium silicate solution. The preferred weight ratio of silica to sodium oxide in the silicate is approximately 3:1. The silica concentration of the diluted silicate is maintained as high as possible to aid in the combination of the silica with the magnesium components as well as to afford a greater rate of production in commercial equipment. Thus, silica concentrations of from 3 to 12 percent give satisfactory results, the preferred concentrations being from 5 to 8 percent. The silica is gelled by mixing it with sulfuric acid by any technique which will provide uniform mixing, thereby preventing solidification and formation of hard lumps of silica gel which would be difficult to disperse and to bring into intimate contact with the hydrated magnesia. For example, the silica and sulfuric acid can be simultaneously added to a reaction vessel provided with strong agitation. Alternatively, overlapping gelation techniques can be employed wherein the silicate solution and mineral acid are separately introduced into a mixing line. Any strong mineral acid can be employed to gel the silicate, for example, nitric acid, sulfuric acid, hydrochloric acid, phosphoric acid and the like. However, sulfuric acid is preferred for economical reasons.

Gelation of the silica is obtained by mixing the dilute sodium silicate solution with a quantity of the mineral acid sufficient to provide a gel pH within the range of from 8.8 to 10.8. Following the gelation step, the silica hydrogel slurry can be mixed with an additional quantity of the mineral acid sufficient to adjust the slurry pH to within the range of from 2.5 to 8.0. Following the final pH adjustment of the silica hydrogel slurry, the silica hydrogel is aged at a temperature of from 70 to 150° F. for from 0.5 to 3 hours.

After the silica gel has been prepared, magnesia is added to give the desired magnesium oxide content in the final product. Suitable forms of magnesia which can be employed include precipitated magnesium hydroxide, calcined magnesium oxide, hydrated calcined magnesium oxide, magnesium oxy salts such as basic magnesium sulfates and chlorides, and the like. After allowing for the loss of water-soluble magnesium compounds through the reaction of sulfuric acid with hydrated calcined magnesia in the presence of silica hydrogel, the magnesia is added to give a magnesia content in the final product of from 17 to 48 percent, expressed as magnesium oxide. The preferred magnesia content is from 20 to 30 percent.

In the preparation of the hydrated calcined magnesia, a minimum amount of water is used for hydration. This is accomplished by preparing a slurry containing about one part MgO to 2 parts by weight of water, heating the slurry to about 130° F. to initiate the hydration reaction, and then slowly adding only sufficient additional water to prevent solidification and to obtain a very viscous but pumpable slurry. This slurry contains about 27 percent magnesia, expressed as MgO. The hydrated slurry is allowed to age for periods of time of from a few hours up to about 18 hours. The magnesia component is more readily dispersed in the silica when a preslurry with water is made prior to mixing with the silica hydrogel. Lumping is avoided by forming a smooth slurry of magnesia in cold water prior to initiating the hydration reaction by heating the slurry. We have found that excellent products may be prepared from "cold" hydrated magnesia when no external heating is employed to initiate the hydration.

A quantity of a strong mineral acid such as sulfuric acid may be mixed with the silica gel-magnesia slurry sufficient to provide from 4 to 25 and preferably from 6 to 10 moles of magnesium hydroxide per mole of acid in the slurry. The acid can be introduced by mixing it with the aged silica hydrogel slurry, the magnesia slurry or the silica hydrogel-magnesia slurry.

After the silica hydrogel slurry is thoroughly mixed the suspension of hydrated calcined magnesia, the silica-magnesia slurry is aged at a temperature of from 125 to 190° F. for from 2 to 8 hours. This aging step is controlled to provide the pore volume desired in the final silica-magnesia-magnesium fluoride composite product. Aging at this stage at higher temperatures for longer periods of time effects an increase in the pore volume of the final product.

Prior to this invention, it was thought that separation of the silica-magnesia product from the reaction mixture slurry was necessary before the silica-magnesia was treated with an aqueous solution containing fluorine. This precaution was taken because procedures were thought to be necessary to avoid formation of fluorine compounds of sodium which were insoluble and which could not be easily removed in the subsequent washing steps in the process. However, it has been found that the silica-magnesia slurry can be mixed with an aqueous solution containing dissolved fluorine prior to the separation step, and that no difficulty is encountered in removing fluorine compounds of sodium by the normal washing steps employed.

Fluorine is introduced into the silica-magnesia component of the slurry as magnesium fluoride or insoluble complexes containing magnesium and fluorine (also denoted herein as magnesium fluoride) by thoroughly mixing the silica-magnesia slurry with an aqueous solution of hydrofluoric acid. A sufficient amount of hydrofluoric acid is employed to provide a fluoride content of 0.5 to 5 percent by weight residual fluorine in the final product. Although hydrofluoric acid is desirable, other compounds containing fluorine which form insoluble salts with magnesium ions can be used to supply the fluorine in the process of this invention. Other soluble fluorides suitable for such use include $NH_4F$, $H_2SiF_4$, $NH_4HF_2$, $(NH_4)_2SiF_5$, etc. Fluorine is important in the catalyst produced by the process of this invention because the fluorine or fluoride ion stabilizes the structure of the catalyst at elevated temperatures. Suitable catalysts can be prepared without fluoride ions if temperatures below 1350° F. are to be encountered. However, if the catalysts must survive temperatures above 1350° F., the catalyst structure collapses if the fluoride ion is not present in the catalyst. For reason of economy, only sufficient quantities of the fluoride are provided in the catalyst to give the desired thermal stability of the product. This amount is largely measured by determining the physical properties and cracking activity of the product after 3 hours of heat treatment at 1550° F. Although it had been found that suitable catalysts can be prepared in which the fluoride concentration is within the range of from 0.5 to 5 percent, the preferred range being from 2 to 3 percent. It has been found that 2.5 percent fluorine is ample for most catalytic processes.

Presence of the fluoride ion shows no particular effect on the surface area of the product at 1700° F., but it imparts a definite increase in pore volume in comparison with products without fluorine. The pore volumes were most favorable when the product was prepared from hydrated calcined magnesia. The surface areas at temperatures above 1700° F. were also more favorable when hydrated magnesia was used to prepare the catalyst.

The silica-magnesia-magnesium fluoride solids are then separated from the reaction mixture and dried. Any conventional drying technique can be employed. However, spray-drying is preferred. The separated silica-magnesia-magnesium fluoride solids are reslurried with water to form a thick suspension before being introduced into the spray-drier. For reasons hereinafter given, the spray-dried solids are preferably wet collected. Alternatively, if some other type of drying procedure is employed, the dried solids are reslurried in water.

In the event that the silica-magnesia is separated from the reaction mixture prior to treatment with the aqueous solution containing fluorine ions, the solids are treated with the fluoride ions at this stage, following the procedure previously described.

One unique characteristic of the process of this invention comprises a second aging step at this stage of the process. The silica-magnesia-magnesium fluoride solids slurried in water are heated within the range of from 160 to 180° F. for from 1 to 4 hours.

In this novel process, the desired pore volume of the final product is obtained by the hot aging conditions in the first stage aging of the silica-magnesia suspension. The desired surface area and activity is then obtained by controlling the hot aging conditions in the second stage wherein the silica-magnesia-magnesium fluoride suspension is treated. The second stage aging may be carried out on the unwashed dried product, the washed and undried product, or the washed and dried reslurried product.

For economic reasons, hot aging of the unwashed spray-dried product is preferred. The temperature of the wet-collected, spray-dried product is such that little additional heating is necessary for the second stage hot aging.

Following the second aging step, the silica-magnesia-magnesium fluoride solids are washed and redried to form the composite product.

A variety of tests have been developed for evaluating cracking catalysts.

The attrition index of a cracking catalyst is obtained by subjecting the catalyst to a high velocity air jet by a standard test known as the Roller test. The weight of the minus 20 micron fraction formed during the test is measured as a criterion of the resistance of the catalyst to inter-particle attrition. The index is obtained by the formula $$\frac{100\,(A-B)}{C}$$

where $A$ = 0–20 micron content of the calcined catalyst after attrition, in grams;
$B$ = 0–20 micron content of calcined catalyst before attrition, in grams;
$C$ = +20 micron content of calcined catalyst before attrition, in grams.

In order to determine the cracking activity and stability of catalysts of the type prepared by the process of this invention, an accelerated test has been devised to simulate the conditions prevalent during the early period of catalyst use where the decreased catalyst stability is most pronounced. This test involves compressing a sample of fresh catalyst into pellets and separating the pellets into two portions, one for thermal deactivation and one for steam deactivation. Thermal deactivation of the catalysts prepared according to the process of this invention are generally carried out by heating at 1250° F. for 3 hours. Other portions of the sample can be treated at higher temperatures. Steam deactivation is carried out by treating the catalyst pellets in an atmosphere of steam at an elevated temperature for a predetermined number of hours.

In carrying out the activity test, 200 milliliters of deactivated catalyst are placed in a reactor and maintained at a temperature of 850° F. for a period of 2 hours, 238.2 milliliters of virgin East Texas light gas oil is passed through the hot catalyst. The cracked products are recovered and separated. The fraction which distills below 400° F., as well as gas and loss, are determined and designated as distillate plus loss, or simply, $D+L$.

The IRA (Indiana Relative Activity) measurements and carbon and gas factor determinations (C.P.F. and G.P.F.) were made with the catalyst produced by the process of this invention as described in the article by A. L. Conn, W. F. Neehen, and R. D. Shankland, Chem. Engr. Prog. 176 (April 1950).

This invention is further illustrated by the following specific but non-limiting examples.

Example 1

This example shows a commercial procedure for carrying out the process of this invention.

A total of 3564 gallons of a dilute sodium silicate solution containing 27.5 g. per liter of $Na_2O$ and 91 g. per liter of $SiO_2$ was added to a 5,000 gallon tank. The tank was equipped for air and mechanical agitation and had a centrifugal pump for circulation of the slurry. The tank was also equipped with closed and open steam heating facilities. The dilute silicate was heated by a heat exchanger to 122° F. and gelled by adding 139 gallons of a 39% sulfuric acid solution. The silica gel was mixed for 10 minutes following gelation, and then an additional 154 gallons of a 39% sulfuric acid solution was added. The pH of the slurry at this point was 6.5. The silica gel was then heated with sparged steam to a temperature of 160° F. and was aged for one hour. The aging time included the time employed for heating the slurry up to this temperature.

A hydrated calcined magnesia slurry was prepared by the following procedure. A total of 1250 pounds (dry basis) of dry calcined magnesia derived from sea water was mixed with 270 gallons of water. The mixture was circulated through a centrifugal pump until a smooth slurry was produced. The slurry was heated to 130° F. to initiate the hydration reaction. The heat of reaction was permitted to raise the temperature of the suspension to boiling. Further water was added to prevent solidification and to adjust the magnesia content of the slurry to 26.5% MgO.

The hydrated magnesia slurry together with an additional 90 gallons of 29% sulfuric acid was then added to the aged silica gel, and the temperature of the mixture was increased to 180° F. using sparged steam. The volume of the silica gel suspension was diluted by 5% in increasing the temperature to 160° F. with the sparged steam. The silica-magnesia slurry was diluted by 10% in increasing the temperature to 180° F. with sparged steam. The slurry was recirculated for one hour with continued agitation.

The silica-magnesia slurry was then aged for 5 hours at 180° F. Then 207 pounds of a 70% hydrofluoric acid solution was added to the slurry. The slurry was then filtered on a rotary filter, and the filter cake was reslurried with sufficient water to obtain a very viscous slurry. The viscous slurry was pumped into a spray-drier surge tank, from which it was pumped into the spray drier. The inlet temperature of the spray drier was 880° F., and the outlet temperature was 390° F. The spray drying pressure was 1700 p.s.i. using 16 spray nozzles.

The spray dried product was then wet collected with sufficient water to provide a slurry which measured 60 volume percent solids when centrifuged. The slurry was pumped to a Dorr thickener where it was aged batch-wise for 2.5 hours at 180° F. Since the temperature of the wet collected, spray dried material slurry was almost 180° F., little additional heat was required.

The hot-aged, spray-dried slurry was then pumped to a wash filter. There the spray-dried slurry was washed in 4 stages. In the first stage the reslurried water containing the salt impurities was removed. In the second stage the product was rinsed with water at temperature of 140° F. In the third stage a 3° Bé. ammonium sulfate solution having a temperature of 110° F. and adjusted to a pH of 8.5 with ammonia was employed as the wash liquid. In the fourth stage the product was rinsed with deionized water at a temperature of 140° F. The washed product was redried to form the composite product.

The chemical and physical characteristics and catalytic activity of the product was determined, and the results are shown in Table A, under Run No. 2.

Silica-magnesia-magnesium fluoride catalysts were also made by the above procedure except that the second aging step was omitted. The product was analyzed and evaluated, and the results are shown in Table A, under Run No. 1.

TABLE A

| | Run No. 1 | Run No. 2 |
|---|---|---|
| Chemical Analysis, wt. percent: | | |
| MgO (d.b.) | 28.30 | 27.61 |
| Na₂O (d.b.) | .05 | .05 |
| SO₄ (d.b.) | .24 | .19 |
| Fe (d.b.) | .08 | .05 |
| F (d.b.) | 3.06 | 2.91 |
| TV @ 1,750° F | 10.00 | 10.51 |
| PhysicalA nalysis,T hermal pretreatment, 3 hrs. at 1,250° F.: | | |
| Surface area, m.²/g | 451 | 512 |
| Pore volume, cc./g | .69 | .69 |
| Thermal pretreatment, 3 hrs. at 1,700° F.: | | |
| Surface area, m.²/g | 117 | 107 |
| Pore volume, cc./g | .41 | .44 |
| Davision attrition index | 16.6 | 15.7 |
| Particle size: | | |
| Retained on 100 mesh screen | 2.7 | 1.6 |
| Retained on 140 mesh screen | 8.3 | 6.0 |
| Passed by 200 mesh screen | 76.0 | 80.8 |
| Catalytic activity, Thermal pretreatment, 3 hrs. at 1,250° F., D+L | 44.2 | 48.1 |
| Steam pretreatment, 16 hrs. at 1,200° F., IRA activity | 61.8 | 71.0 |

As can be seen by comparing the surface area, pore volume, and particularly the IRA activity of the silica-magnesia-magnesium fluoride catalysts made by Run No. 1 and the process of this invention employing a second stage aging step, an improvement in the surface area and IRA activity of the catalyst was obtained while the pore volume and thermal stability of the catalyst was retained. Furthermore, no difficulty was encountered in removing sodium from the catalysts even though the silica-magnesia was contacted with the fluorine containing solution prior to filtration.

Example 2

In this example, an unwashed spray-dried product prepared as described in Example 1 was obtained and separated into two portions. One portion (Sample A) was washed and dried as described in Example 1 without the secondary aging step.

The second portion (Sample B) was aged for 2.5 hours at 180° F. using slow agitation and supplying heat to the slurry by means of a hot water jacket surrounding the aging tank. The aged product was then washed in water and finally dried as described in Example 1.

Sample A and Sample B were analyzed and evaluated to determine the effect of the secondary aging step. The results obtained are shown in Table B.

TABLE B

| | Sample A | Sample B |
|---|---|---|
| Chemical Analysis, wt. percent (d.b.): | | |
| MgO | 28.28 | 27.93 |
| Na₂O | .05 | .04 |
| SO₄ | .15 | .16 |
| F | 3.03 | 3.19 |
| Physical characteristics after thermal pretreatment, 3 hrs. at 1,250° F.: | | |
| Surface area, m.²/g | 459 | 501 |
| Pore volume, cc./g | .67 | .70 |
| IRA activity | 57.3 | 70.6 |
| Davision attrition index | 20 | 20 |

A comparison of the surface area, pore volume, and IRA activity of Sample A and Sample B show that the secondary aging step provided an increased surface area and IRA activity in the final product. This improvement was obtained without a decrease in pore volume. This is significant because a corresponding surface area increase could have been obtained by prolonged aging of the silica-magnesia slurry prior to spray drying, but such process is expensive and is accompanied by an intolerable decrease in pore volume. The decrease pore volume is detrimental to the thermal stability to the final product since it affects the fluorine distribution to the product composite.

Example 3

In this example, the washed and dried, spray-dried product was hot aged with water, a departure from the procedure wherein unwashed, spray-dried product was hot aged with water.

In this example, the procedure of Example 1 was followed to produce the aged silica gel slurry and calcined magnesia slurry.

The hydrated magnesia slurry together with an additional 90 gallons of 29% sulfuric acid was then added to the aged silica gel, and the temperature of the mixture was increased to 165° F. using sparged steam. The volume of the silica gel (prior to addition of the magnesia) was diluted by 5% in using sparged steam to increase the temperature to 160° F. The silica gel-magnesia slurry was diluted by 7% in increasing the temperature to 165° with sparged steam. The slurry was recirculated for 1 hour with continued agitation.

The silica-magnesia slurry was then aged for 5 hours at 165° F. Then 207 pounds of a 70% hydrofluoric acid solution was added to the slurry. The slurry was then filtered on a rotary filter, and the filter cake was reslurried with sufficient water to obtain a very viscous slurry. The viscous slurry was pumped into the spray drier range tank from which it was pumped into the spray drier. The inlet temperature of the spray drier was 880° F. and the outlet 390° F. The spray drying pressure was 1700 p.s.i. using 16 spray nozzles.

The spray dried product was then wet collected with sufficient water to provide a slurry which measured 60 volume percent solids when centrifuged. The slurry was then pumped to a wash filter. There the spray dried product was washed in 4 stages. In the first stage the reslurry water containing salt impurities was removed. In the second stage the product was rinsed with water at a temperature of 140° F. In the third stage a 3° Bé. ammonium sulfate solution having a temperature of 110° F., and adjusted to a pH of 8.5 with ammonia was employed as the wash liquor. In the fourth stage the product was rinsed with deionized water at a temperature of 140° F. The washed product was then redried (Sample C, Table C).

400 grams of the above-dried product was reslurried in two liters of water and aged with slow agitation for 4 hours at 180° F. The aged product was filtered and finally dried (Sample D, Table C).

The marked increase in surface area and IRA activity for the aged Sample D over the unaged Sample C is shown in Table C. These improvements were obtained without loss in pore volume.

TABLE C

| | Sample C | Sample D |
|---|---|---|
| Chemical Analysis, wt. percent (d.b.): | | |
| MgO | 28.97 | |
| Na₂O | 0.05 | |
| SO₄ | 0.27 | |
| F | 2.80 | |
| Characteristics after thermal pretreatment, 3 hrs. at 1,250° F.: | | |
| Surface area, m.²/g | 416 | 514 |
| Pore volume, cc./g | .94 | .94 |
| IRA activity | 36.8 | 76.4 |
| G.P.F | 1.26 | 1.11 |
| G.P.F | .83 | .59 |
| Davision attrition index | 21.5 | 21.5 |

Obviously, many modifications and variations of the invention as hereinabove set forth may be made without departing from the essence and scope thereof, and only such limitations should be applied as are indicated in the claims.

We claim:
1. A process for preparing a silica-magnesia-magnesium fluoride hydrocarbon cracking catalyst containing from 0.5 to 5 weight percent fluorine comprising the steps of:
   (a) acidifying a dilute sodium silicate solution with a strong mineral acid in an amount sufficient to effect gelation of the silica,
   (b) mixing the hydrogel slurry with a quantity of a strong mineral acid sufficient to adjust the slurry pH to within the range of from 2.5 to 8.0, (c) aging the silica hydrogel at a temperature of from 70 to 150° F. for from 0.5 to 3 hours, (d) mixing the acidified hydrogel slurry with magnesia, (e) aging the silica-magnesia slurry at a temperature of from 120 to 190° F. for from 2 to 8 hours, (f) mixing the aged silica-magnesia slurry with a quantity of an aqueous solution containing dissolved fluorine ions sufficient to provide from 0.5 to 5 percent fluorine in the final product, (g) separating the silica-magnesia-magnesium fluoride solids from the reaction mixture and drying the solids, (h) reslurrying the dried solids in water and aging the silica-magnesia-magnesium fluoride slurry at a temperature within the range of from 160 to 180° F. for from 1 to 4 hours, and (i) washing and redrying the resulting composite.

2. The process of claim 1 wherein the aged silica hydrogel is mixed with magnesia and a quantity of a strong mineral acid sufficient to provide from 4 to 25 moles of magnesium hydroxide per mole of acid in the slurry.

3. The process of claim 2 wherein the quantity of the strong mineral acid is sufficient to provide from 6 to 10 moles of magnesium hydroxide per mole of acid in the slurry.

4. The process of claim 1 wherein the aged silica gel is mixed with precipitated magnesium hydroxide.

5. The process of claim 1 wherein the aged silica gel is mixed with calcined magnesium oxide.

6. The process of claim 1 wherein the aged silica gel is mixed with calcined, hydrated magnesium oxide.

7. A process for preparing a silica-magnesia-magnesium fluoride hydrocarbon cracking catalyst containing from 0.5 to 5% fluorine comprising the steps of:

(a) acidifying a dilute sodium silicate solution with a strong mineral acid in an amount sufficient to effect gelation of the silica, (b) mixing the hydrogel slurry with a quantity of a strong mineral acid sufficient to adjust the slurry pH to within the range of from 2.5 to 8.0, (c) aging the silica hydrogel at a temperature of from 70 to 150° F. for from 0.5 to 3 hours, (d) mixing the hydrogel slurry with magnesia, (e) aging the silica-magnesia slurry at a temperature of from 120 to 190° F. for from 2 to 8 hours, (f) separating the silica-magnesia solids from the reaction mixture, (g) reslurrying the silica-magnesia solids in water, and mixing the silica-magnesia slurry with an aqueous solution containing dissolved fluorine in a quantity sufficient to provide from 0.5 to 5% fluorine in the final product, (h) drying the slurry, (i) reslurrying the dried solids in water and aging the silica-magnesia-magnesium fluoride slurry at a temperature within the range of from 160 to 180° F. for from 1 to 4 hours, and (j) washing and redrying the resulting composite.

8. The process of claim 7 wherein the aged silica hydrogel is mixed with magnesia and a quantity of a strong mineral acid sufficient to provide from 4 to 25 moles of magnesium hydroxide per mole of acid in the slurry.

9. The process of claim 8 wherein the quantity of the strong mineral acid is sufficient to provide from 6 to 10 moles of magnesium hydroxide per mole of acid in the slurry.

10. The process of claim 7 wherein the aged silica gel is mixed with precipitated magnesium hydroxide.

11. The process of claim 7 wherein the aged silica gel is mixed with calcined magnesium oxide.

12. The process of claim 7 wherein the aged silica gel is mixed with calcined, hydrated magnesium oxide.

References Cited

UNITED STATES PATENTS

| | | | |
|---|---|---|---|
| 2,377,116 | 5/1945 | Voorhies et al. | 208—110 |
| 3,129,189 | 4/1964 | Wilson et al. | 252—441 |

DANIEL E. WYMAN, *Primary Examiner.*

L. G. MANDONI, *Assistant Examiner.*